(12) United States Patent
Sears (10) Patent No.: US 9,770,153 B2
(45) Date of Patent: *Sep. 26, 2017

(54) STITCH BONDED CLEANING MATERIAL

(71) Applicant: Tietex International Ltd., Spartanburg, SC (US)

(72) Inventor: Lori Shannon Sears, Milwaukie, OR (US)

(73) Assignee: TIETEX INTERNATIONAL LTD., Spartanburg, SC (US)

( * ) Notice: Subject to any disclaimer, the term of this patent is extended or adjusted under 35 U.S.C. 154(b) by 309 days.

This patent is subject to a terminal disclaimer.

(21) Appl. No.: 14/599,008

(22) Filed: Jan. 16, 2015

(65) Prior Publication Data

US 2015/0128370 A1 May 14, 2015

Related U.S. Application Data

(63) Continuation of application No. 13/675,888, filed on Nov. 13, 2012, now Pat. No. 8,935,824.

(Continued)

(51) Int. Cl.
| | |
|---|---|
| *A47L 13/16* | (2006.01) |
| *A47L 13/256* | (2006.01) |
| *A47L 13/20* | (2006.01) |
| *D05C 17/00* | (2006.01) |
| *D04B 21/16* | (2006.01) |
| *B32B 7/02* | (2006.01) |

(Continued)

(52) U.S. Cl.
CPC .............. *A47L 13/16* (2013.01); *A47L 13/20* (2013.01); *A47L 13/256* (2013.01); *B32B 5/022* (2013.01); *B32B 5/245* (2013.01); *B32B 5/26* (2013.01); *B32B 7/02* (2013.01); *B32B 7/045* (2013.01); *B32B 7/08* (2013.01); *D04B 21/165* (2013.01); *D05C 17/00* (2013.01); *B32B 2262/0253* (2013.01); *B32B 2307/726* (2013.01); *B32B 2307/728* (2013.01); *B32B 2432/00* (2013.01); *Y10T 428/23929* (2015.04); *Y10T 428/23979* (2015.04)

(58) Field of Classification Search
CPC ........ D04B 21/02; D04B 21/14; D04B 21/16; D04B 21/165; D04B 1/10; D04H 13/001
USPC ................ 15/208, 209.1, 228, 229.1, 229.2; 428/88, 89, 92, 95; 112/410, 420, 440; 66/190, 191
See application file for complete search history.

(56) References Cited

U.S. PATENT DOCUMENTS

| | | |
|---|---|---|
| 4,542,739 A | 9/1985 | Schafer et al. |
| 2008/0280094 A1 | 11/2008 | Wildeman |

(Continued)

FOREIGN PATENT DOCUMENTS

| | | |
|---|---|---|
| KR | 10-20110118733 | 10/2011 |
| WO | 98-51850 | 11/1998 |

OTHER PUBLICATIONS

ISA/KR International Search Report for interantional Application No. PCT/US2012/064941, Mar. 29, 2013.

(Continued)

*Primary Examiner* — Andrew A Horton
(74) *Attorney, Agent, or Firm* — J. M. Robertson, LLC (57) ABSTRACT

A wipe structure of stitch bonded construction incorporating one or more substrate layers of an absorbent material with a barrier layer across a face side of the absorbent material and a preformed lightweight loop fabric disposed across the underside of the absorbent layers with loops projecting away from the absorbent layers.

19 Claims, 4 Drawing Sheets

Related U.S. Application Data

(60) Provisional application No. 61/559,176, filed on Nov. 14, 2011.

(51) Int. Cl.
  *B32B 5/24* (2006.01)
  *B32B 5/26* (2006.01)
  *B32B 7/08* (2006.01)
  *B32B 5/02* (2006.01)
  *B32B 7/04* (2006.01)

(56) References Cited

U.S. PATENT DOCUMENTS

| | | |
|---|---|---|
| 2010/0247846 A1 | 9/2010 | Erickson |
| 2010/0263152 A1 | 10/2010 | Wildeman |
| 2010/0263154 A1 | 10/2010 | Wildeman |

OTHER PUBLICATIONS

EPO Supplemental European Search Report for European Application No. EP 12850304.

STITCH BONDED CLEANING MATERIAL

CROSS REFERENCE TO RELATED APPLICATIONS

This nonprovisional application claims the benefit of, and priority from, U.S. application Ser. No. 13/675,888 filed Nov. 13, 2012, now U.S. Pat. No. 8,935,824 which claims priority from U.S. provisional application 61/559,176 filed Nov. 14, 2011. The contents of such prior applications and all other documents referenced herein are hereby incorporated by reference in their entirety as if fully set forth herein.

TECHNICAL FIELD

The present disclosure relates generally to cleaning systems for counters, floors and other surfaces. More particularly, the disclosure relates to replaceable absorbent wipes with a construction incorporating a cleaning surface overlying an absorbent interior and adapted for attachment relative to a user manipulated handle. Exemplary non-limiting uses may include domestic or industrial cleaning of hard surfaces, floors, bathrooms, kitchens and the like.

BACKGROUND

Fabric formation using so-called stitch bonding techniques is well known. In such processes, a multiplicity of stitching yarns is passed repeatedly in stitching relation through one or more substrate layers in closely spaced rows so as to form a coordinated arrangement of surface stitches in covering relation to the substrate. It is possible to use such stitch bonding techniques to form substantially uniform surfaces covered by the stitching yarns. It is also possible to impart patterns of stitching yarns across the surface by manipulation of the formation process. Such patterns may use upstanding loops, substantially flat stitches or combinations thereof.

SUMMARY OF THE DISCLOSURE

The present disclosure provides advantages and/or alternatives over the prior art by providing a wipe structure of stitch bonded construction incorporating one or more substrate layers of an absorbent material with a barrier layer across a face side of the absorbent material and a preformed lightweight loop fabric disposed across the underside of the absorbent layers with loops projecting away from the absorbent layers.

In one exemplary construction, face-forming stitching yarns of multi-filament construction may be introduced in partially threaded stitching relation through the layers to define a striped pattern across the face with rows of raised microfiber loops separated by stitch-free zones free of raised microfiber loops. The face of the wipe with the rows of raised microfiber loops defines a cleaning surface. A lightweight preformed loop fabric disposed across the underside defines an attachment surface facing away from the cleaning surface. The loops of yarns across the attachment surface may attach to hooking elements across a surface of a user manipulated mop head or other structure to define a hook and loop attachment system.

In accordance with one exemplary aspect, the present disclosure provides a cleaning element of stitch-bonded construction having a multi-surface operative cleaning face. The cleaning element includes at least one fluid absorbing layer of absorptive cellular material. A cover layer of substantially hydrophobic material is disposed in overlying relation to the fluid absorbing layer. A backing layer of preformed loop material is disposed in underlying relation to the fluid absorbing layer. The preformed loop material includes a plurality of loop elements projecting away from the underside of the fluid absorbing layer such that the fluid absorbing layer, the cover layer and the backing layer form a stacked composite. A plurality of stitching yarns extends in discontinuous patterned stitched relation through discrete selected zones of the stacked composite such that the stitching yarns form a patterned array of surface loop zones projecting outwardly away from the cover layer in a defined patterned arrangement across the operative cleaning face of the cleaning element. A plurality of stitch-free zones with the cover layer forming the outer surface are disposed at positions between surface loop zones across the operative cleaning face of the cleaning element.

BRIEF DESCRIPTION OF THE DRAWINGS

The accompanying drawings which are incorporated in and which constitute a part of this specification illustrate exemplary constructions and procedures in accordance with the present disclosure and, together with the general description of the disclosure given above, and the detailed description set forth below, serve to explain the principles of the disclosure wherein.

While the disclosure has been illustrated and will hereinafter be described in connection with certain exemplary embodiments and practices, it is to be understood that in no event is the disclosure to be limited to such illustrated and described embodiments and practices. On the contrary, it is intended that the present disclosure shall extend to all alternatives and modifications as may embrace the general principles of this disclosure within the full and true spirit and scope thereof.

DESCRIPTION OF THE PREFERRED EMBODIMENTS

Figure 1:
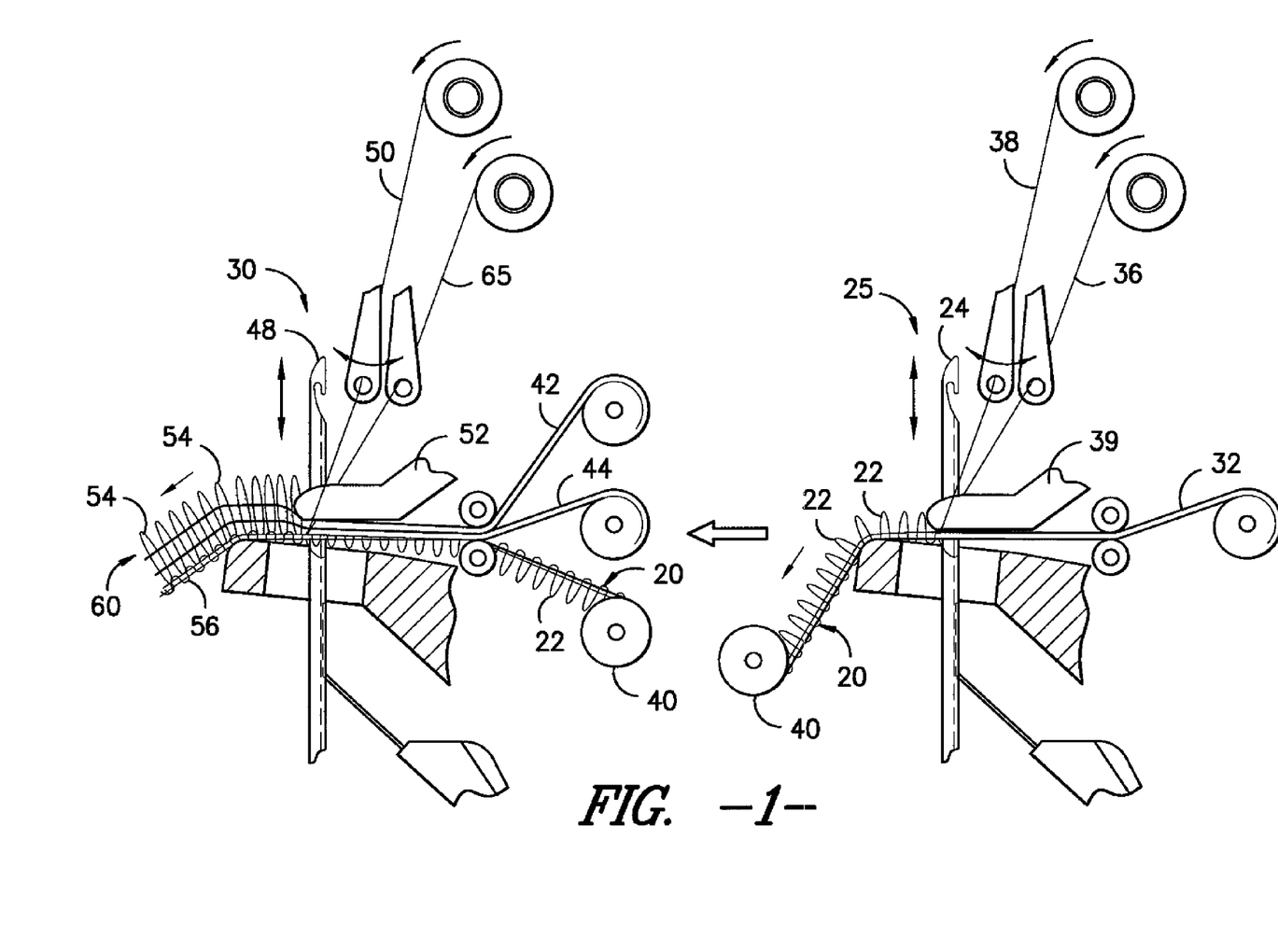
FIG. 1 illustrates schematically an exemplary two-stage stitch bonding system adapted to form a cleaning wipe material using multiple layers of material with loops projecting away from opposing faces.

Turning now to the drawings, FIG. 1 illustrates schematically an exemplary two-stage method utilized to form a cleaning wipe adapted for attachment to hook elements projecting from a support structure such as a mop head or the like. As shown, in a first formation stage, a preformed loop material 20 with a surface of outwardly projecting preformed loops 22 may be formed by a plurality of needles 24 at a first stitching location 25 using a stitch-bonding process as will be known to those of skill in the art. As will be appreciated, in the stitch-bonding process, a pattern of rows of stitches is formed by passing stitching yarns through one or more layers of substrate material such that the stitching yarns cooperatively form at least a partial covering of stitches across the substrate material. In a second formation stage, the preformed loop material 20 then may be delivered to a second stitching location 30 for selective overstitching with other layers. As shown, according the illustrated exemplary practice the preformed loop material 20 may be fed to the second stitching location 30 in layered relation to the other material layers with the preformed loops 22 projecting downwardly across the so called "technical face" of the layered composite to form a structure with loops projecting away from both faces of the final structure.

Figure 2:
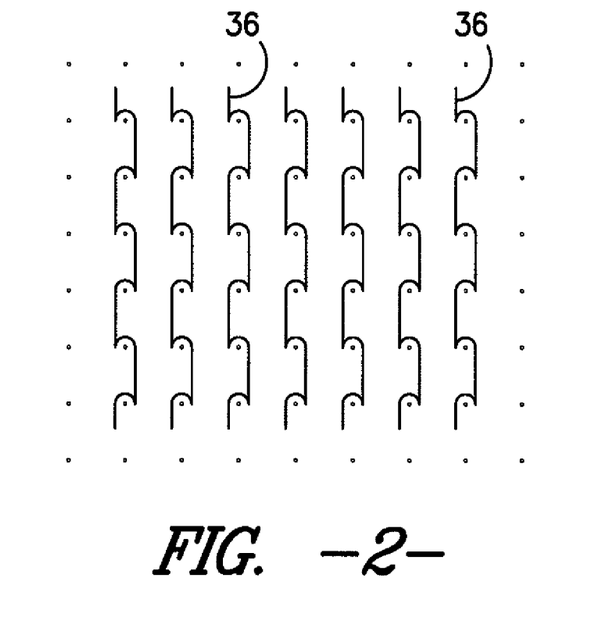
FIG. 2 is a needle point diagram illustrating an exemplary stitching pattern for ground stitches through a substrate in a preformed looped backing fabric disposed across the underside of a cleaning wipe according to the present disclosure.
Figure 3:
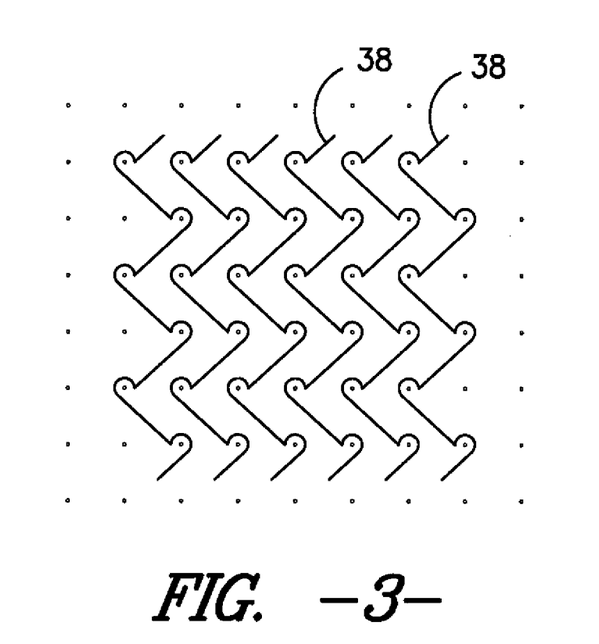
FIG. 3 is a needle point diagram illustrating an exemplary stitching pattern for loop elements in preformed looped backing fabric disposed across the underside of a cleaning wipe according to the present disclosure.

Referring jointly to FIGS. 1, 2 and 3, according to one exemplary practice, the preformed loop material 22 may be a two-bar stitch-bonded fabric formed at the first stitching location 25 by stitching two yarn systems through a lightweight substrate 32. By way of example only, and not limitation, one potentially desirable substrate 32 for the preformed loop material 22 is a low-density polymeric film such as low density polyethylene (LDPE) or the like having a mass per unit area of not more than 100 grams per square meter and more preferably, about 5 to 50 grams per square meter. One such exemplary film is a 1-mil thickness LDPE film having a mass per unit area of about 23 grams per square meter sold under the trade designation FT-540 by Filmtech, Inc. having a place of business at Allentown, Pa. However, other materials and/or different weights and thicknesses may likewise be used if desired. Such materials may be substantially impermeable to liquid such that they form a barrier against liquid transmission across their thickness dimension.

Referring to FIGS. 2 and 3, exemplary stitching patterns are shown for a two-bar preformed loop material 20. In the illustrated two bar construction, ground yarns 36 forming a first yarn system are stitched in a fully threaded chain stitch arrangement to form a ground covering across the lightweight substrate 32. By way of example only, and not limitation, the ground yarns 36 may have a linear density of about 20 denier to about 300 denier. One such suitable yarn is 40 denier/12 filament fully oriented polyester yarn. However, other yarn constructions and filament counts including monofilament may likewise be utilized if desired.

According to one exemplary practice, the preformed loops 22 may be formed by loop yarns 38 stitched in fully threaded relation through the substrate 32. By way of example only, and not limitation, the loop yarns 38 may have a linear density of about 20 denier to about 300 denier. One such suitable yarn is a 40 denier/12 filament fully oriented polyester yarn. However, other yarn constructions and filament counts including monofilament may likewise be utilized if desired.

In the fully threaded arrangement, the loop yarns 38 will form a substantially continuous pattern of stitched-in preformed loops 22. By way of example only, the loops 22 may be formed by passing the loop yarns 38 back and forth over sinker fingers 39 in a zigzag pattern between adjacent needles 24. In this regard, while only a single needle 24 is shown, in actual practice a large number of such needles are arranged in close relation to one another in the cross machine direction. The crossing segments of the loop yarns 38 extending between stitch lines thus define the preformed loops 22. By way of example only, a sinker height of about 2 mm may be used. However, other heights may be used if desired. The resultant preformed loop material 20 may then be taken up as a roll 40 or be delivered directly to the second stitching location for subsequent overstitching as will now be described.

Referring again to FIG. 1, in the illustrated exemplary practice, a layer of lightweight abrasion resistant substrate material 42, a layer of absorbent substrate material 44 and a layer of the preformed loop material 20 are conveyed to the second stitching location 30 at a stitch bonding apparatus as will be well known to those of skill in the art. In the illustrated exemplary construction, the layer of lightweight abrasion resistant substrate material 42 defines a cover layer of the multilayer composite and the preformed loop material 20 defines a backing layer.

It is contemplated that the abrasion resistant substrate material 42, the absorbent substrate material 44 and the preformed loop material 20 may be delivered to a separate stitching apparatus defining the second stitching location 30. However, it is also contemplated that the same apparatus may be used for both the first stitching location 25 and the second stitching location 30. That is, the preformed loop material 20 may be formed and stored and then be delivered back to the same apparatus for stitching with the additional layers.

As will be readily understood by those of skill in the art, the second stitching location 30 is defined by a row of reciprocating needles 48 extending in adjacent relation to one another across the width of the materials being stitched. As will be appreciated, while only a single needle has been illustrated, in actual practice a large number of such needles are arranged in close relation to one another in the cross machine direction. It is contemplated that the so called gauge or needle density in the cross machine direction may be adjusted as desired. By way of example only, and not limitation, it is contemplated that the needle density may be in the range of about 7 to about 28 needles per inch and more preferably about 14 needles per inch although higher and lower needle densities may likewise be used if desired.

By way of example only, and not limitation, in one exemplary process the abrasion resistant substrate material 42 may be a polypropylene spunbond sheet having a mass per unit area of about 27 gram per square meter. As will be appreciated, such material provides protection against abrasion of the underlying absorbent substrate material. Moreover, the polypropylene is substantially hydrophobic and will pass moisture into the interior. Of course, other materials and/or weights may be used if desired.

By way of example only, and not limitation, the absorbent substrate material 44 may be a nonwoven cellular material. One exemplary nonwoven is an air laid thermobonded nonwoven formed predominantly of hydrophilic cellulosic fiber constituents with supplemental levels of thermoplastic binders. One such material which has been found to be suitable is sold under the trade designation VIZORB X819 by Buckeye Technolgies Inc. having a place of business in Memphis, Tenn., USA.

In accordance with one exemplary practice, the absorbent substrate material 44 may be a nonwoven with a mass per unit area of about 50 to 800 grams per square meter and more preferably about 200 to about 500 grams per square meter and most preferably about 300 grams per square meter. Of course, while the process is illustrated as using a single layer of absorbent substrate material 44, it is likewise contemplated that two or more layers may be used if desired.

Other absorbent substrate materials 44 may likewise be suitable. By way of example only, and not limitation, other cellular materials may include polymeric foams including cellular layered sheet materials and sponge cloth as will be known to those of skill in the art. Regardless of the absorbent substrate material 44 which is used, it is contemplated that such material should not require a super absorbent gelling polymer to enhance absorption. However, such a gelling polymer may be included if desired.

According to the illustrated practice, at the second stitching location 30 a multiplicity of face-forming stitching yarns 50 is carried through a group of yarn guides carried by a guide bar in a partially threaded pattern for cooperative engagement with a first group of the needles 48 across the width of the stacked substrate materials. A second group of the needles 48 across the width is not engaged by the face-forming stitching yarns 50. This partial threading of the needles 48 by the face-forming stitching yarns 50 results in creating spaced voids in the stitching pattern. In accordance with one exemplary practice, the face-forming stitching yarns 50 may have a linear density of about 60 denier to about 400 denier, although higher or lower levels may be used if desired.

In accordance with one exemplary practice, the face-forming stitching yarns 50 may be stitched through the stacked substrate layers 20, 42, 44 using a stitch notation such as (1-0, 2-1)// or the like with sinker fingers 52 disposed between needles 48. During the stitch formation practice, the face-forming stitching yarns 50 are looped over the sinker fingers 52 as they pass between adjacent reciprocating needles thereby producing an arrangement of face loops 54 projecting outwardly away from the so called "technical back" of the resultant composite. Flat locking stitches 56 are formed across the so called "technical face" of the resultant composite. In accordance with one exemplary practice, a pile sinker height of about 2 to 6 millimeters (most preferably 4 millimeters) may be used although greater or lesser heights may be used if desired.

Figure 4:
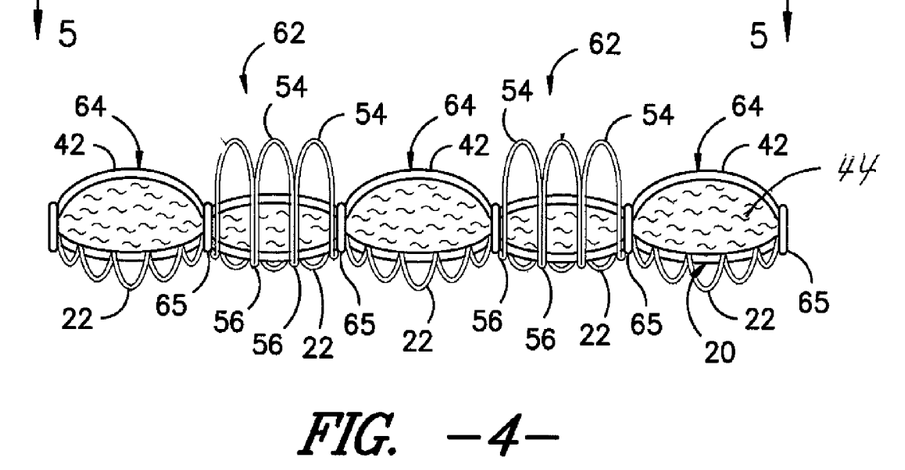
FIG. 4 illustrates schematically a cross-section of a segment of an exemplary cleaning wipe material incorporating a plurality of face-forming stitching yarns with low dpf levels stitched in partial threaded relation through an absorbent layer, an abrasion barrier face layer and a pre-formed loop backing layer.

Following stitching, the resultant stitch-bonded wipe material 60 may be segmented in the machine and cross-machine directions to yield a cleaning wipe or pad with desired dimensions and having a cross section corresponding generally to that shown in FIG. 4. In the final construction the face loops 54 formed by the face-forming stitching yarns 50 cooperatively define a cleaning face and the loops 22 of the preformed loop material 20 cooperatively form a backing surface of the wipe. As will be appreciated, while an exemplary cleaning wipe (FIG. 5) is shown as generally rectangular, the stitch-bonded wipe material 60 may be segmented to provide virtually any shape as may be desired.

In accordance with one exemplary practice, the face-forming stitching yarns 50 may be formed from ultrafine fiber of less than 1 denier per filament (dpf). Such yarns are characterized by a soft feel and very high effective surface area. In this regard, such microfiber yarns may be made up of at least a predominant percentage of fiber with a dpf level of less than 0.8 and will more preferably be made up of at least a predominant percentage of fiber with a dpf level of less than 0.6 and will most preferably be made up of at least a predominant percentage of fiber with a dpf level of less than 0.4 when evaluated on a weight basis. That is, according to the potentially preferred practice, 51% or more of the fiber weight in the face-forming stitching yarns 50 may be made up of fibers with these dpf levels. In accordance with one exemplary embodiment, such microfiber yarns may be formed substantially entirely from fiber with a dpf level of about 0.4 or less. By way of example only, and not limitation, one yarn construction for use as the face-forming stitching yarns is a 150/288 (i.e. 150 denier, 288 filament) textured polyester yarn. While polyester may be potentially desirable for the microfiber yarns, other natural or synthetic materials including nylon, polypropylene, cotton or blends of any identified materials also may be used if desired.

Figure 5:
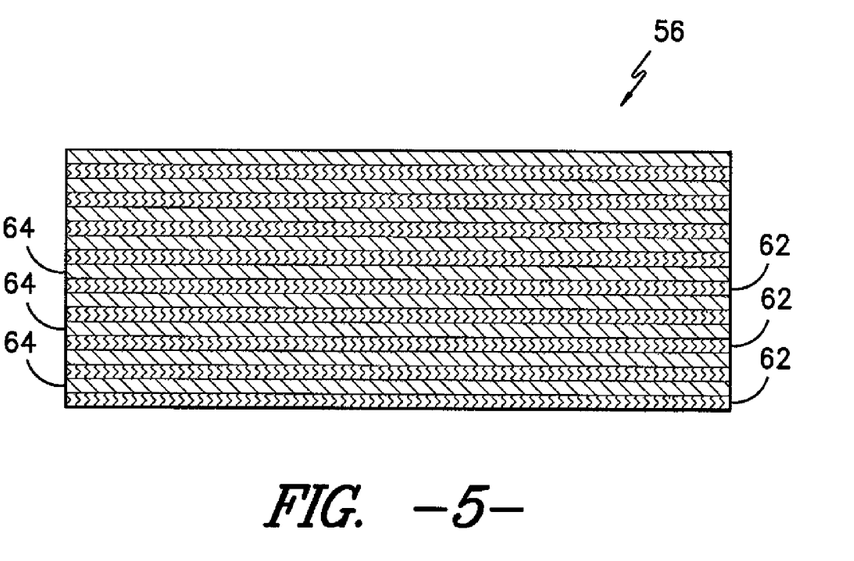
FIG. 5 is a schematic plan view of the cleaning face of an exemplary cleaning wipe taken generally along line 5-5 in FIG. 4 and illustrating a pattern of alternating rows of loop zones formed from face-forming stitching yarns and stitch-free zones between the loop zones.

As best seen through joint reference to FIGS. 4 and 5, the partial threading of the face-forming stitching yarns 50 creates loop zones 62 arranged as stripes running across the face in the machine direction of the wipe material 60. These loop zones 62 are separated by stitch-free zones 64 arranged as stripes running in the machine direction of the wipe material 56. Within the stitch-free zones 64, the abrasion resistant material 42 forms the exterior of the cleaning surface. As shown, the stitch-free zones 64 may form raised convex surfaces between the loop zones due to the resilient character of the underlying absorbent substrate material 44 which is not compressed by stitching in these regions. In the illustrated exemplary construction, tie-down yarns 65 are stitched in a chain stitch or other suitable pattern along the boundary edges between the loop zones 62 and the stitch-free zones 64 to prevent unraveling of the face loops 54.

By way of example only and not limitation, one exemplary repeating pattern of loop zones 62 and stitch-free zones 64 may be formed by stitching 4 ends of the face-forming stitching yarns 50 followed by skipping 4 needles to provide a 4 in/4 out pattern which may be repeated across the width of the stitch bonding machine to provide rows of loop zones 62 in adjacent, alternating relation to rows of stitch-free zones 64 (FIG. 5). Of course, it is to be understood that while a repeating pattern of 4 in/4 out may provide a desirable striped pattern, any number of other threading arrangements may likewise be used to provide desired patterning.

Figure 6:
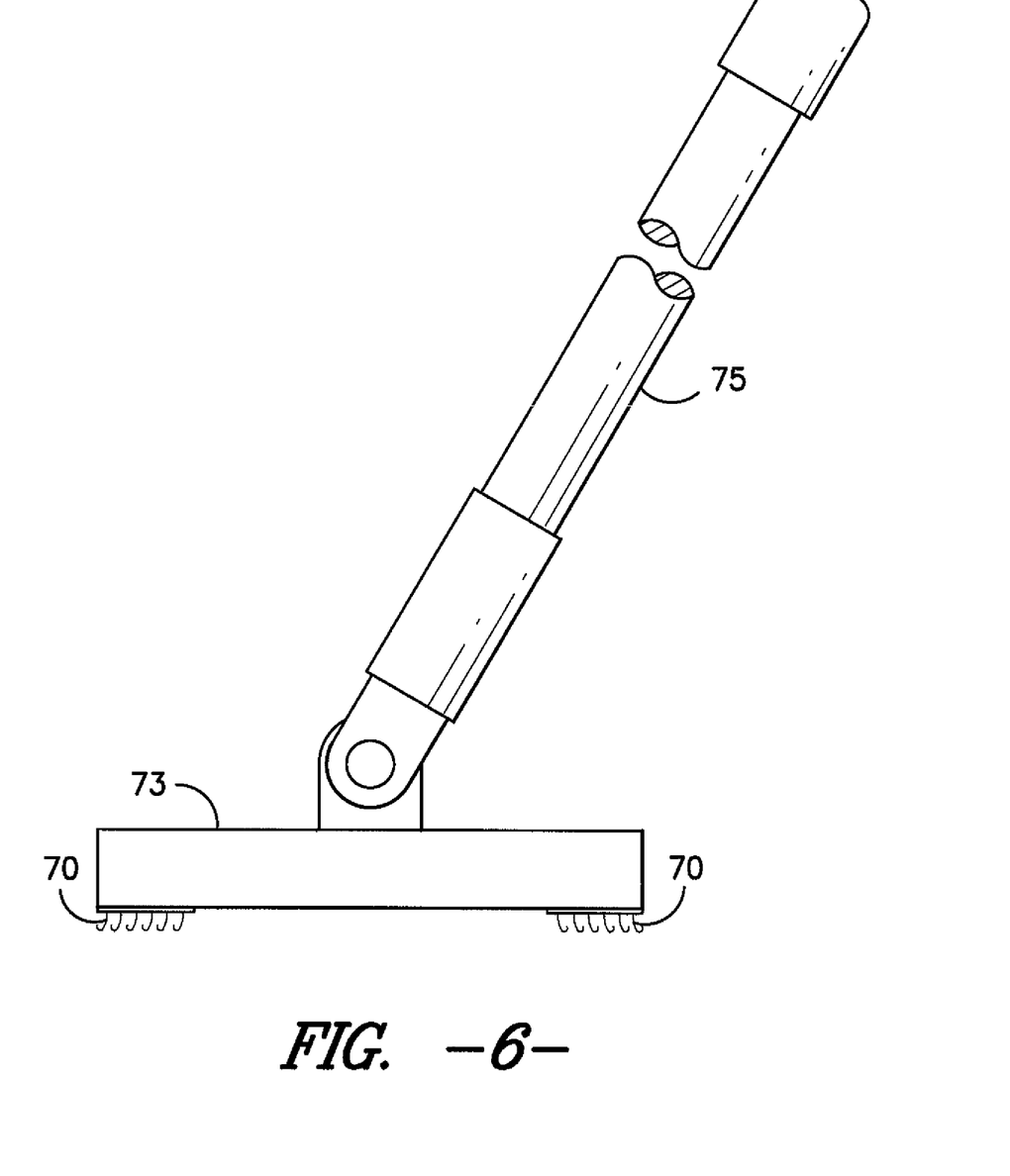
FIG. 6 is a view illustrating an exemplary mop head for hook and loop attachment to the underside of a cleaning wipe according to the present disclosure.

As best seen in FIG. 4, the preformed loops 22 project outwardly away from the underside of the stitch-free zones 64. Portions of the preformed loops 22 may also project outwardly from the underside of the loop zones 62. In practice, in the final construction the preformed loops 22 may cooperatively form an engagement surface across the underside for hook and loop attachment to hook elements 70 on a mop head 73 or other supporting structure which may be operatively connected to a user manipulated handle 75 (FIG. 6).

As will be appreciated, the structure of the wipe material 60 provides substantial benefits. In particular, the loop zones 62 may provide highly efficient particle collection and retention, while the stitch-free zones provide an abrasion resistant scrubbing surface. In the event that the wipe material is used in conjunction with water or cleaning fluid, the fluid may be passed through the abrasion resistant material 42 for collection and retention in the absorbent material 44. However, the substantially liquid impermeable substrate in the preformed loop material 20 will substantially block fluid from passing to the underside of the wipe material. Thus, upon application of pressure by the mop head 73 or other support structure, the cleaning fluid may be expelled back through the face and onto the surface to be cleaned.

Of course, variations and modifications of the foregoing are within the scope of the present disclosure. Thus, it is to be understood that the disclosure disclosed and defined herein extends to all alternative combinations of two or more of the individual features mentioned or evident from the text and/or drawings. All of these different combinations constitute various alternative aspects of the disclosure. The embodiment described herein explain the best modes for practicing the disclosure and will enable others skilled in the art to utilize the disclosure. The claims are to be construed to include alternative embodiments and equivalents to the extent permitted by the prior art.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Various features of the disclosure are set forth in the following claims.

What is claimed is:

1. A cleaning element of stitch-bonded construction having a multi-surface operative cleaning face, the cleaning element comprising:
    at least one fluid absorbing layer comprising absorptive cellular material;
    a cover layer disposed in overlying relation to the at least one fluid absorbing layer;
    a backing layer of preformed loop material disposed in underlying relation to the at least one fluid absorbing layer, the preformed loop material including a plurality of loop elements projecting away from the underside of the at least one fluid absorbing layer such that the at least one fluid absorbing layer, the cover layer and the backing layer form a stacked composite; and
    a plurality of stitching yarns extending in discontinuous patterned stitched relation through discrete selected zones of the stacked composite such that the plurality of stitching yarns form a patterned array of surface loop zones projecting outwardly away from the cover layer in a defined patterned arrangement across the multi-surface operative cleaning face of the cleaning element with a plurality of stitch-free zones with the cover layer forming an outer surface disposed at positions between surface loop zones across the operative cleaning face of the cleaning element.

2. The cleaning element as recited in claim 1, wherein the plurality of stitching yarns are textured polyester yarns made up predominantly of microdenier filaments having a linear density of less than 0.8 denier per filament.

3. The cleaning element as recited in claim 1, wherein the plurality of stitching yarns are textured polyester yarns made up predominantly of microdenier filaments having a linear density of less than 0.6 denier per filament.

4. The cleaning element as recited in claim 1, wherein the plurality of stitching yarns are textured polyester yarns made up predominantly of microdenier filaments having a linear density of less than 0.4 denier per filament.

5. The cleaning element as recited in claim 1, wherein the absorptive cellular material is a nonwoven hydrophilic cellular material.

6. The cleaning element as recited in claim 5, wherein the cover layer and underlying absorptive cellular material are not perforated within the plurality of stitch-free zones.

7. The cleaning element as recited in claim 1, wherein the plurality of stitching yarns are characterized by a linear density in the range of 60 denier to 400 denier.

8. A cleaning system comprising a cleaning element as recited in claim 1 in combination with a mop head operatively connected to a handle.

9. A cleaning element of stitch-bonded construction having a multi-surface operative cleaning face, the cleaning element comprising:
    at least one fluid absorbing layer comprising absorptive cellular material;
    a cover layer of material disposed in overlying relation to the at least one fluid absorbing layer;
    a backing layer of preformed loop material of stitch-bonded construction disposed in underlying relation to the at least one fluid absorbing layer, the preformed loop material comprising a plurality of loop elements stitched through a substrate layer, the backing layer being oriented with the plurality of loop elements projecting away from the underside of the at least one fluid absorbing layer, the at least one fluid absorbing layer, the cover layer and the backing layer forming a stacked composite; and
    a plurality of stitching yarns extending in discontinuous patterned stitched relation through discrete selected zones of the stacked composite such that the stitching yarns form a patterned array of surface loop zones projecting outwardly away from the cover layer in a defined patterned arrangement across the multi-surface operative cleaning face of the cleaning element with a plurality of stitch-free zones with the cover layer forming an outer surface disposed at positions between surface loop zones across the multi-surface operative cleaning face of the cleaning element and such that the patterned array of surface loop zones comprises rows of surface loops in adjacent alternating relation to rows of the plurality of stitch-free zones and wherein a portion of the plurality of loop elements in the backing layer project away from the plurality of stitch-free zones in a direction opposite from the surface loops to define rows of loop elements projecting away from the underside of the fluid absorbing layer.

10. The cleaning element as recited in claim 9, wherein the plurality of stitching yarns are textured polyester yarns made up predominantly of microdenier filaments having a linear density of less than 0.8 denier per filament.

11. The cleaning element as recited in claim 9, wherein the plurality of stitching yarns are textured polyester yarns made up predominantly of microdenier filaments having a linear density of less than 0.6 denier per filament.

12. The cleaning element as recited in claim 9, wherein the plurality of stitching yarns are textured polyester yarns made up predominantly of microdenier filaments having a linear density of less than 0.4 denier per filament.

13. The cleaning element as recited in claim 9, wherein the absorptive cellular material is a nonwoven hydrophilic cellular material.

14. The cleaning element as recited in claim 9, wherein the cover layer and underlying absorptive cellular material are not perforated within the plurality of stitch-free zones.

15. The cleaning element as recited in claim 9, wherein the plurality of stitching yarns are characterized by a linear density in the range of 60 denier to 400 denier.

16. The cleaning element as recited in claim 9, wherein the preformed loop material comprises a plurality of loop elements stitched through a substrate layer of substantially liquid impermeable polymeric film.

17. The cleaning element as recited in claim 16, wherein the polymeric film is a polyethylene film having a mass per unit area of about 5 to 50 grams per square meter.

18. The cleaning element as recited in claim 9, wherein the cover layer comprises a fibrous nonwoven sheet.

19. The cleaning element as recited in claim 18, wherein the cover layer comprises a polypropylene spunbond sheet having a mass per unit area of about 5 to 50 grams per square meter.

* * * * *